(12) United States Patent
Hall et al.

(10) Patent No.: US 8,009,743 B2
(45) Date of Patent: Aug. 30, 2011

(54) METHOD AND SYSTEM FOR POWERING A DEVICE USING A DATA COMMUNICATIONS SIGNAL LINE

(75) Inventors: Stewart E. Hall, Wellington, FL (US); James A. Cook, Boynton Beach, FL (US)

(73) Assignee: Sensormatic Electronics, LLC, Boca Raton, FL (US)

( * ) Notice: Subject to any disclaimer, the term of this patent is extended or adjusted under 35 U.S.C. 154(b) by 1515 days.

(21) Appl. No.: 11/334,925

(22) Filed: Jan. 19, 2006

(65) Prior Publication Data
US 2007/0168596 A1    Jul. 19, 2007

(51) Int. Cl.
*H04L 25/00* (2006.01)
(52) U.S. Cl. ......................................... 375/257
(58) Field of Classification Search .................. 375/257; 710/313
See application file for complete search history.

(56) References Cited

U.S. PATENT DOCUMENTS

| | | | |
|---|---|---|---|
| 4,734,919 A * | 3/1988 | Tae | 375/219 |
| 5,771,174 A * | 6/1998 | Spinner et al. | 700/129 |
| 5,842,027 A * | 11/1998 | Oprescu et al. | 713/300 |
| 6,473,608 B1 | 10/2002 | Lehr et al. | |
| 6,976,179 B1 * | 12/2005 | Gosselin et al. | 713/300 |
| 7,159,132 B2 * | 1/2007 | Takahashi et al. | 713/310 |
| 7,447,922 B1 * | 11/2008 | Asbury et al. | 713/300 |
| 2001/0052044 A1 * | 12/2001 | Hsu | 710/260 |
| 2004/0172207 A1 * | 9/2004 | Hancock et al. | 702/60 |

OTHER PUBLICATIONS

Dr.-Ing. Eckhard Braß, Dr.-Ing. Hans Gustat, "Energieversorgung über Feldbus," Elektronik 25/1993, pp. 70-73, Germany (and English translation).

* cited by examiner

*Primary Examiner* — Shuwang Liu
*Assistant Examiner* — Helene Tayong
(74) *Attorney, Agent, or Firm* — Alan M. Weisberg; Christopher & Weisberg, P.A.

(57) ABSTRACT

A system and method for transferring power using a data communications signal line. The data communications signal line is in a high impedance powerless state when idle. A main device is electrically coupled to the data communications signal line. The main device generates and transmits a signal on the data communications signal line. The signal includes power generation and non-power generation characters. A peripheral device is electrically coupled to the data communications signal line. The peripheral device has a functional unit arranged to perform a desired function for the peripheral device. A power conversion module is electrically coupled to the data communications signal line and receives the signal. The power conversion module converts power from the received signal to a form suitable for storage. A controller is in electrical communication with the functional unit and the power conversion module. The controller receives the power generation and non-power generation characters, strips the power generation characters from the signal and transmits the non-power generation characters to the functional unit.

25 Claims, 4 Drawing Sheets

METHOD AND SYSTEM FOR POWERING A DEVICE USING A DATA COMMUNICATIONS SIGNAL LINE

CROSS-REFERENCE TO RELATED APPLICATIONS n/a

STATEMENT REGARDING FEDERALLY SPONSORED RESEARCH OR DEVELOPMENT n/a

BACKGROUND OF THE INVENTION

1. Statement of the Technical Field

The present invention relates to providing power to peripheral devices, and more particularly to providing power to a device such as a wireless transmitter using a data communications signal line that is not always active.

2. Description of the Related Art

While new devices and buses such as the Universal Serial Bus ("USB") include provisions for providing power to remotely connected peripheral devices, there is a very large body of technologies and deployed equipment that provide interfaces for serial communication to remote devices that do not include provisions for providing power. Many serial interface technologies, such as RS-485 and RS-422 interfaces, were historically used for programming or configuration access by service personnel, or hard wired to centralized systems. However, it is desirable to be able to use these interfaces to allow transmission for remote telemetry or configuration without the need for hard wired retrofitting, such as through the use of low power, low data rate radio communications.

In addition, it is also possible that existing installations that are to be retrofitted to allow remote communication using devices such as radios do not include additional power outlets, or make other provisions for providing external power. Even for new installations, adding outlets to power peripheral devices such as radios adds to the cost of installation as well as the time needed to install the outlets or otherwise run power to installation location.

Many types of serial interfaces, such as RS-485 and RS-422 interfaces, do not provide for powering devices coupled to the interface. In large part this is because such interfaces operate in a differential mode are maintained in a high impedance un-powered state when the interface is inactive. As such, power can not be provided to a connected peripheral device via the serial interface and, as noted above, the remote device must be powered by running a separate power line from another source, using a battery, etc.

By way of a specific and practical example, many electronic article surveillance systems have sensors and deactivators that are interconnected or configured via RS-485 interfaces. Installations can more easily be completed if remote communications can be accomplished wirelessly using low power low data rate radios. Also, expanding existing installations is greatly simplified if radios that are powered by the deactivators or sensors themselves can be used rather than running additional wire and power to the installation location. For example, consider how much less expensive and less disruptive it would be to add an additional cash register lane at a retail store if the deactivator could communicate with the central processing unit using a wireless communication link in a manner that did not impose an additional power receptacle or battery burden. It is therefore desirable to have an arrangement that allows interfaces that are typically un-powered when inactive to provide power to an interconnected device.

SUMMARY OF THE INVENTION

The present invention addresses the deficiencies of the art in respect to powering peripheral devices such as wireless transmitters using communication interfaces that are typically not always active or available to power the peripheral device. In this regard, the system of the present invention is arranged to cause the main device to transmit characters to the peripheral device that are used to provide power to the peripheral device. The peripheral device is arranged to distinguish between the power generation characters and non-power generation characters, e.g., data to be transmitted.

According to one aspect, the present invention provides a system for transferring power using a data communications signal line. The data communications signal line is in a high impedance powerless state when idle. A main device is electrically coupled to the data communications signal line. The main device generates and transmits a signal on the data communications signal line. The signal includes power generation and non-power generation characters. A peripheral device is electrically coupled to the data communications signal line. The peripheral device has a functional unit arranged to perform a desired function for the peripheral device. A power conversion module is electrically coupled to the data communications signal line and receives the signal. The power conversion module converts power from the received signal to a form suitable for storage. A controller is in electrical communication with the functional unit and the power conversion module. The controller receives the power generation and non-power generation characters, strips the power generation characters from the signal and transmits the non-power generation characters to the functional unit.

According to another aspect, the present invention provides a method for receiving power from a data communications signal line in which the data communications signal line is in a high impedance powerless state when idle. A signal is received on the data communications signal line in which the signal has power generation and non-power generation characters. Power from the received signal is converted to a form suitable for storage. The power generation characters are stripped from the signal. The non-power generation characters are transmitted to a functional unit.

According to still another aspect, the present invention provides a device for receiving power from a data communications signal line in which the data communications signal line is in a high impedance powerless state when idle. The device includes a functional unit arranged to perform a desired function for the device. A power conversion module is electrically coupled to the data communications signal line and receives a signal on the data communications signal line. The signal includes power generation and non-power generation characters. The power conversion module converts power from the received signal to a form suitable for storage. A controller is in electrical communication with the functional unit and the power conversion module. The controller receives the power generation and non-power generation characters, strips the power generation characters from the signal and transmits the non-power generation characters to the functional unit.

Additional aspects of the invention will be set forth in part in the description which follows, and in part will be obvious from the description, or may be learned by practice of the invention. The aspects of the invention will be realized and attained by means of the elements and combinations particularly pointed out in the appended claims. It is to be understood that both the foregoing general description and the following detailed description are exemplary and explanatory only and are not restrictive of the invention, as claimed.

BRIEF DESCRIPTION OF THE DRAWINGS

The accompanying drawings, which are incorporated in and constitute part of this specification, illustrate embodiments of the invention and together with the description, serve to explain the principles of the invention. The embodiments illustrated herein are presently preferred, it being understood, however, that the invention is not limited to the precise arrangements and instrumentalities shown, wherein.

DETAILED DESCRIPTION OF THE PREFERRED EMBODIMENTS

Figure 1:
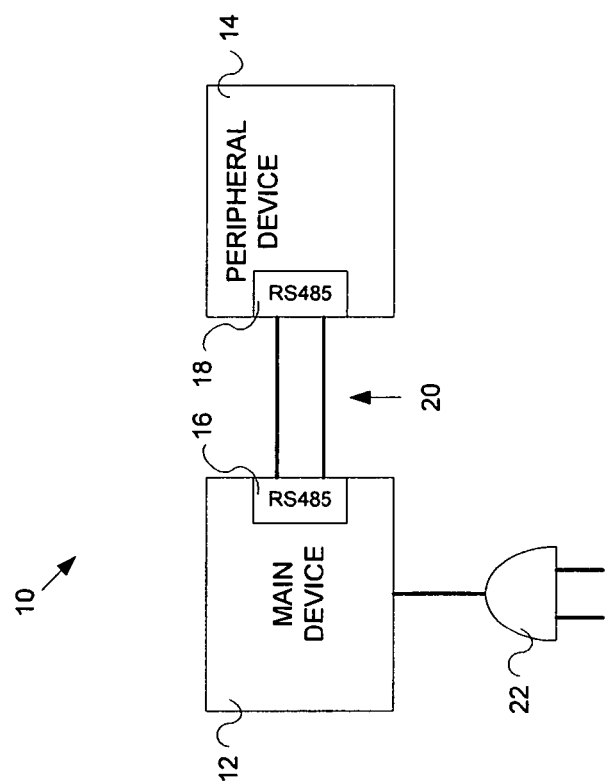
FIG. 1 is a block diagram of a serial port powered system constructed in accordance with the principles of the present invention.

The present invention advantageously provides a system that allows a peripheral device to receive power from a serial communications line whose protocol does not typically allow for the transmission of power from the main device to the peripheral device. Referring now to the drawing figures in which like reference designators refer to like elements there is shown in FIG. 1 a system constructed in accordance with the principles of the present invention and designated generally as "10." System 10 includes main device 12 and peripheral device 14, each having a serial interface 16 and 18, respectively, that are electrically interconnected via serial communications line 20. Of note, although the present invention is described with reference to serial interfaces 16 and 18, and in particular serial interfaces using the RS-485 protocol, the invention is not limited to such and the ensuing description is offered for ease of understanding. It is contemplated that the present invention is applicable to any communication protocol, whether serial or parallel and whether balanced or unbalanced, that does not normally provide power to the signal lines when the lines are inactive. For example, it is contemplated that the present invention can be implemented on serial lines that use the RS-422 protocol or other protocols that provide a tri-stated, high impedance output when not active.

As used herein, the terms "data" and "characters" are used interchangeably and refer to the signal transmitted on serial communications line 20 between main device 12 and peripheral device 14. Further, the term "power generation character" refers to a signal transmitted from main device 12 to peripheral device 14 which carries data only used for the purpose of providing power to the peripheral device.

In operation, and as described below in detail, main device 12 generates and provides characters (pulses) to peripheral device 14 that are stored by and used to power peripheral device 14. These characters can be generated during idle periods where no "real" data, i.e. information, is to be transmitted to peripheral device 14. As discussed below in detail, peripheral device 14 discerns that the characters are for power and are not real data to be further processed in some way, such as further wireless transmission. The energy from the power generation characters is stored within peripheral device 14 for further use, such as for powering a wireless transmitter and the other components of peripheral device 14. The present invention is therefore very well suited to powering low power wireless radio transmitters.

Also, because the present invention makes use of existing communication interfaces, such as RS-485 interfaces, existing implementations of RS-485 based main devices 12 can be used to support peripheral devices 14 that require power. This arrangement advantageously allows for the installation of peripherals such as wireless radio transmitters rather than hard-wiring the serial port of main device 12 to the main computer, or adding power outlets to provide power for the peripheral devices.

Main device 12 can be any computing device capable of generating a serial signal for transmission to peripheral device 14. For example, main device 12 can be a desktop or laptop computer, a personal digital assistant ("PDA") and the like. Main device 12 can also be a specific purpose computing device such as an electronic article surveillance device. In addition to serial interface 16, main device 12 includes hardware components as known in the art and as may be required to implement the functions of the present invention described herein. For example, main device 12 can include one or more storage units such as IDE, SCSI and RAID drives, additional volatile or non-volatile memory, a central processing unit, input and output devices, display units and the like, controllable by an operating system and/or one or more application software programs. Main device is powered via power source 22. Power source can be a line-based source, such as an alternating current power outlet, a battery, or any other suitable source of power.

As discussed below in detail, main device 12 is arranged to generate and transmit power generation characters to peripheral device 14. It is contemplated that existing main device 12 implementations can be retrofitted with revised firmware to provide this function and that new hardware is not required. For example, main device 12 firmware can be revised to transmit constant power generation characters to peripheral device 14 in the absence of real data. In the alternative, main device 12 firmware can be revised to transmit periodic power generation characters to peripheral device 14 in the absence of real data. As still another alternative, main device 12 firmware can be revised to transmit power generation characters to peripheral device 14 on demand based on instructions received from peripheral device 14 via serial line 20 in which the instructions include the length (number of characters and/or pulses) and/or duration (length of time) of power generation pulses required.

Figure 2:
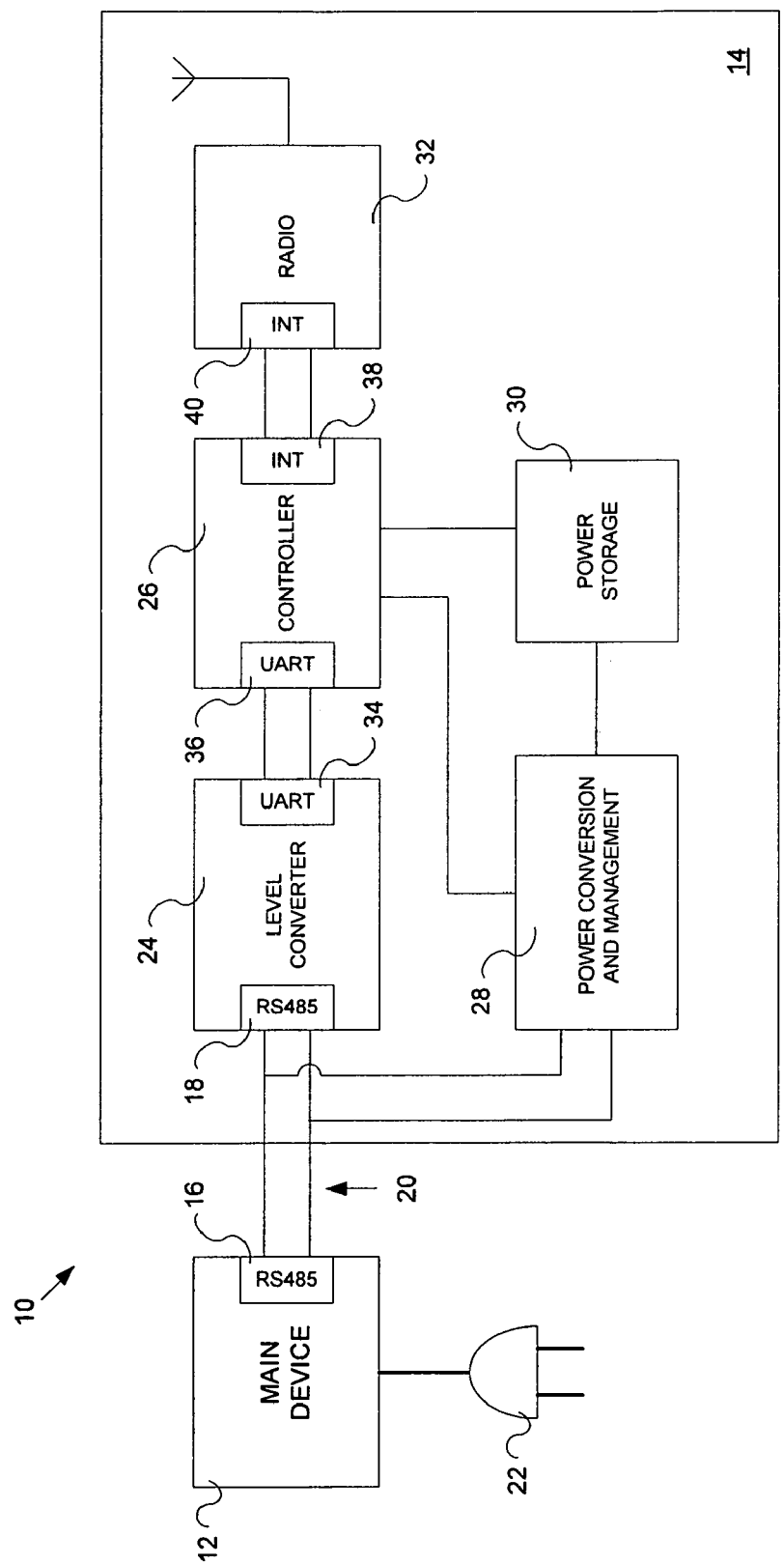
FIG. 2 is a block diagram with a detailed view of the peripheral device powered by the serial communications line.

Peripheral device 14 and its interaction with main device 12 are described with reference to FIG. 2. Peripheral device 14 includes level converter 24, controller 26, power conversion and management module 28, power storage unit 30 and a functional unit, such as a radio transceiver, 32. Such a radio transceiver can be capable of transmitting at the same data rate as the data rate of signal communications line 20 or faster, for example, transmitting at twice the data rate of signal communications line 20. Of course, any component intended to serve to perform the specific function of peripheral device 14 can be used as functional unit 32. As noted above, the present embodiment is described with respect to a low-power radio transceiver serving as functional unit 32, but the invention is not limited to such. For example, a portable low-power LCD-based display can serve as functional unit 32 to aid field-level configuration and diagnostics. External data storage devices used for data collection and external sensors for environmental situation monitoring, external security keys, etc., are additional examples of functional units 32.

Figure 3:
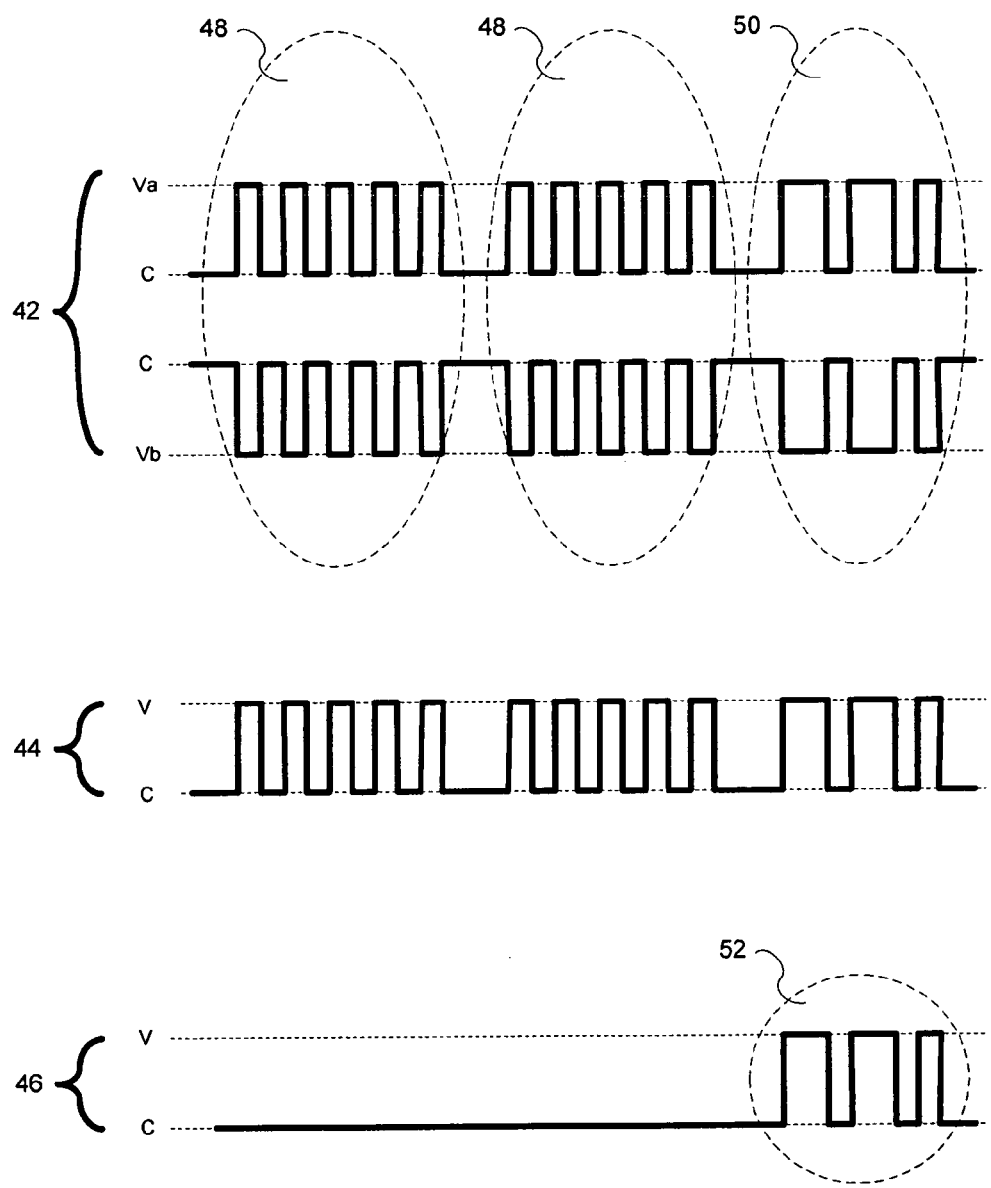
FIG. 3 is a timing diagram showing signal lines having power generation characters and non-power generation characters.

Level converter 24 receives and transmits a serial data stream to/from main device 12 via serial interface 18 and converts the signal to a common channel data stream via universal asynchronous receiver transmitter ("UART") 34. Level converter 24 can be any level converting integrated circuit as may be known in the art that is arranged to receive and convert a data stream from one electrical signal level to another. For example, as shown in FIG. 2, level converter 24 communicates with main device 12 via a differential RS-485 signal, and converts that signal to a common channel signal for communication with controller 26. By way of example which is explained in more detail below, differential pulse train 42, shown in FIG. 3, depicts an RS-485 signal received at interface 18. Single-ended common channel signal 44, also shown in FIG. 3, is output by UART 34 for transmission to controller 26.

Controller 26 can be a microprocessor, micro-controller or other suitable device arranged to control the functions of peripheral device 14, particularly with respect to the power conversion functions described herein. As is shown in FIG. 2, controller 26 includes an interface 36, such as a UART arranged to transmit and receive common channel signals from level converter 24, such as those shown in FIG. 3, with respect to common channel signal 44. Referring again to FIG. 2, controller 26 is also in electrical communication with power conversion and management module 28 and power storage unit 30. Controller 26 is also arranged with an interface 38 to transmit "real" (non-power generation) data to functional unit 32 via interface 40 for subsequent processing or, in the case of a radio serving as functional unit 32, wireless transmission. Interfaces 38 and 40 can be any suitable interfaces as may be known in the art, such as a UART, Can Bus, or other serial peripheral interface ("SPI").

As discussed below in detail, controller 26 receives common channel signal 44 from level converter 24, and detects which of these characters are solely for power generation. Controller 26 strips these power generation characters from the data stream and transmits the non-power generation, i.e. real, characters to functional unit 32 via interface 38. For example, referring to FIG. 3, differential signal 42 includes power generation characters 48 and differential non-power generation characters 50. When received by controller 26, controller 26 strips the power generation characters 48, and transmits only non-power generation characters 52 to functional unit 32. Within the context of a radio transmitter serving as functional unit 32, controller 26 transmits non-power generation characters 52 to the radio for subsequent wireless transmission.

Controller 26 also monitors the amount of power available and can transmit a request to main device 12 to send power generation characters to peripheral device 14 via serial line 20. Controller 26 is also arranged to power down functional unit 32 to put it into a low power "sleep" mode to conserve battery power. For example, controller 26 can shut down the wireless transmitter when there is no data to transmit. In addition, non-power generation characters received from main device 12 can be buffered in a memory (not shown) within peripheral device 14 for future transmission when functional unit 32 is in "sleep" mode. Buffering can also be used to buffer received data if functional unit 32 receives data from an external source, e.g., remote wireless transmitter, at a rate that is faster than that of serial communications line 20. This arrangement advantageously further conserves battery power and reduces the amount of power generation characters that must be sent from main device 12.

Power conversion and management module 28 derives power for peripheral device 14 via connections to serial communications line 20. In operation, power conversion and management module 28 includes capacitors or other similar devices which store power from the power generation characters, convert that power to direct current for storage in power storage device 30. In other words, power conversion and management module 28 derives the power from serial communications line 20, and sends that power to power storage device 30. Power conversion can be accomplished, for example, through an AC/DC voltage converter, such as a switching regulator, so that direct current ("DC") can be applied to recharge power storage device 30.

Power storage device 30 is a rechargeable battery, capacitor or other device known in the art for storing and supplying power. As shown in FIG. 2, power storage device 30 is coupled to controller 26. Of course, it is contemplated that power storage device 30 also supplies power to the other devices included in peripheral device 14. However, controller 26 is arranged to control the distribution of that power, for example, the intermittent powering of a radio transceiver as functional device 32.

Power conversion and management module 28 is in data communication with controller 26. Controller 26 uses power conversion and management module 28 to detect low battery, i.e., "brownout" conditions. Power conversion and management module 28 includes circuitry to determine the actual power availability from power generation characters on signal line 20. When a "brownout" or low power condition is detected by controller 26, controller 26 requests power generation characters from main device 12. However, as noted above, such is not necessarily the case. It is contemplated that main device 12 can be programmed to periodically send power generation characters and/or transmit power generation characters to peripheral device 14 when there are no non-power generation characters to be transmitted to peripheral device 14.

Referring to FIG. 3, although power generation characters are shown as a continuous stream of binary ones, the invention is not limited to such. Any data arrangement that results in the supply of voltage and current to peripheral device 14 can be used as long as controller 26 can identify the stream as including power generation characters so it can filter out the power generation characters prior to transmission to functional device 32.

Figure 4:
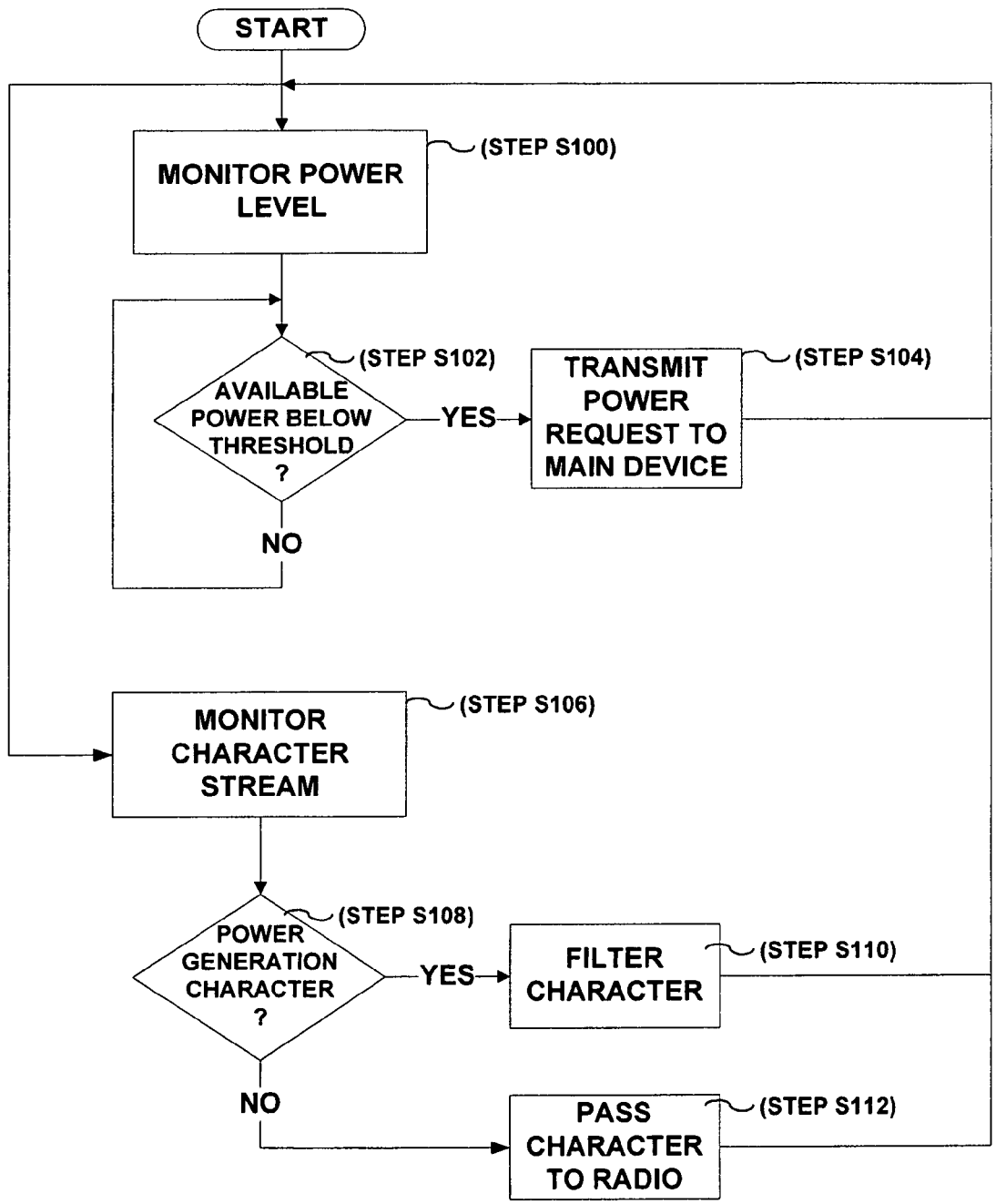
FIG. 4 is a flow chart of the main power conversion related processes performed by a controlled constructed in accordance with the principles of the present invention.

The main functions of controller 26 are described with reference to FIG. 4. For those implementations in which controller 26 will notify main device 12 that power is required, controller 26 monitors the power level via power conversion and management module 28 (step S100). If the available power is below a predetermined threshold (step S102), controller 26 transmits a power request to main device 12 (step S104).

As noted above, controller 26 also monitors the character stream in order to determine whether the characters are power generation characters or real data to be further processed by functional unit 32. Accordingly, controller 26 monitors the character stream (step S106). If the character received from level converter 24 is a power generation character (step S108), the character is filtered (step S110) and is not transmitted to functional unit 32. If the character is not a power generation character (step S108), the character is passed to functional unit 32 (step S112), e.g., the radio, for transmission.

There are also a number of alternate arrangements that can be used to strip power generation characters. For example, it is contemplated that main device 12 can be programmed to transmit power generation characters at a baud rate that is not recognized by controller 26 and/or functional unit 32 and therefore not passed beyond functional unit 32, e.g., through the radio channel. As another example, digital logic can be used in place of controller 26 to simply disable level converter 24 or the input of functional unit 32 when a power generation character is sent. As still another example, the functionality of controller 26 can be included as part of main device 12. However, this arrangement results in the need to add control signal lines to interface between the controller in main device 12 and some/all of the other elements within peripheral device 14.

Of course, it is also contemplated that controller 26 can be configured not to filter any characters, whether solely for power generation or not, and instead passes all characters to functional unit 32. For example, controller 26 can pass all characters to the radio and the characters that were intended solely for power generation can be stripped from the data stream on the receiver side. In such a case, the power generation characters can be removed at the peripheral device level in the receiving side, or the power generation characters can be removed in the main device at the receiving side, thereby reducing the cost of implementation by avoiding the need to include controllers or other logic in peripheral device.

The present invention therefore advantageously provides a system which allows peripheral devices coupled to a main device via an interface that operates in a high impedance, tri-state mode when there is no data to transmit, to receive power from the main device without the need for periodic battery replacement, the use of additional power outlets, wires, etc.

The present invention can be realized in hardware, software, or a combination of hardware and software. An implementation of the method and system of the present invention can be realized in a centralized fashion in one computer system or in a distributed fashion where different elements are spread across several interconnected computer systems. Any kind of computer system, or other apparatus adapted for carrying out the methods described herein, is suited to perform the functions described herein.

Significantly, this invention can be embodied in other specific forms without departing from the spirit or essential attributes thereof, and accordingly, reference should be had to the following claims, rather than to the foregoing specification, as indicating the scope of the invention.

We claim:

1. A device for receiving power from a data communications signal line, the data communications signal line being in a high impedance powerless state when idle, the device comprising:
a functional unit arranged to perform a desired function for the device;
a power conversion module, the power conversion module being electrically coupled to the data communications signal line and receiving a signal on the data communications signal line, the signal being comprised of power generation and non-power generation characters, the power conversion module deriving power from the power generation characters and converting the power to a form suitable for storing and supplying the power to energize components; and
a controller, the controller in electrical communication with the functional unit and the power conversion module, the controller:
receiving the power generation and non-power generation characters;
stripping the power generation characters from the signal;
transmitting the non-power generation characters to the functional unit;
monitoring a power level of the device; and
causing the transmission of a request on the serial line for power generation characters when the power level drops below a predetermined threshold.

2. The device of claim 1, wherein the signal line is an electrically balanced serial communications signal line.

3. The device of claim 2, wherein the serial communications line is an RS-485 communications line.

4. The device of claim 3, wherein the functional unit is a radio transceiver.

5. The device of claim 4, further including a power storage unit in electrical communication with the power conversion module and the controller, the power storage unit storing power received from the power conversion module.

6. The device of claim 2, further including a level converter electrically coupled to the serial communications line and the controller, the level converter converting the electrically balanced signal to a common mode signal, the level converter communicating with the controller using the common mode signal.

7. The device of claim 1, wherein the controller decreases power supplied to the functional unit when the functional unit is idle.

8. The device of claim 1, wherein the request includes at least one of a duration of time and a quantity of the power generation characters to be transmitted.

9. A method for receiving power from a data communications signal line, the data communications signal line being in a high impedance powerless state when idle, the method comprising:
receiving a signal on the data communications signal line, the signal being comprised of power generation and non-power generation characters;
deriving power from the power generation characters;
converting the power from the received signal to a form suitable for storage;
supplying the stored power to energize components;
stripping the power generation characters from the signal;
transmitting the non-power generation characters to a functional unit of a device, the functional unit arranged to perform a desired function for the device;
monitoring a power level of the device; and
causing the transmission of a request on the data communication signal line for power generation characters when the power level drops below a predetermined threshold.

10. The method of claim 9, wherein the signal line is an electrically balanced serial communications signal line.

11. The method of claim 10, wherein the serial communications line is an RS-485 communications line.

12. The method of claim 11, wherein the functional unit is a radio transceiver.

13. The method of claim 10, further comprising converting the electrically balanced signal to a common mode signal.

14. The method of claim 9, further comprising decreasing power supplied to the functional unit when the functional unit is idle.

15. The method of claim 9, wherein the request includes at least one of a duration of time and a quantity of the power generation characters to be transmitted.

16. The method of claim 9, further comprising periodically transmitting power generation characters on the data communications signal line.

17. The method of claim 9, further comprising transmitting power generation characters on the data communications signal line when there are no non-power generation characters to be transmitted.

18. A system transferring power using a data communications signal line, the data communications signal line being in a high impedance powerless state when idle, the system comprising:
- a main device, the main device being electrically coupled to the data communications signal line, the main device generating and transmitting a signal on the data communications signal line, the signal being comprised of power generation and non-power generation characters; and
- a peripheral device electrically coupled to the data communications signal line, the peripheral device having:
  - a functional unit arranged to perform a desired function for the peripheral device;
  - a power conversion module, the power conversion module being electrically coupled to the data communications signal line and receiving the signal, the power conversion module deriving power from the power generation characters and converting the power to a form suitable for storing and supplying the power to energize components; and
  - a controller, the controller in electrical communication with the functional unit and the power conversion module, the controller:
    - receiving the power generation and non-power generation characters;
    - stripping the power generation characters from the signal;
    - transmitting the non-power generation characters to the functional unit;
    - monitoring a power level of the device; and
    - causing the transmission of a request on the serial line for power generation characters when the power level drops below a predetermined threshold.

19. The system of claim 18, wherein the signal line is an electrically balanced serial communications signal line.

20. The system of claim 19, wherein the serial communications line is an RS-485 communications line.

21. The system of claim 20, wherein the functional unit is a radio transceiver.

22. The system of claim 19, wherein the peripheral device further includes a level converter electrically coupled to the serial communications line and the controller, the level converter converting the electrically balanced signal to a common mode signal, the level converter communicating with the controller using the common mode signal.

23. The system of claim 18, wherein the controller decreases power supplied to the functional unit when the functional unit is idle.

24. The system of claim 18, wherein the request includes at least one of a duration of time and a quantity of the power generation characters to be transmitted.

25. The system of claim 18, wherein the main device transmits power generation characters on the data communications signal line when there are no non-power generation characters to be transmitted.

\* \* \* \* \*